United States Patent
Ryu et al.

(10) Patent No.: US 12,463,199 B2
(45) Date of Patent: Nov. 4, 2025

(54) METHOD OF PRE-LITHIATING NEGATIVE ELECTRODE FOR ALL-SOLID-STATE SECONDARY BATTERIES AND SECONDARY BATTERY USING THE SAME

(71) Applicant: LG ENERGY SOLUTION, LTD., Seoul (KR)

(72) Inventors: Ji Hoon Ryu, Daejeon (KR); Eun Bee Kim, Daejeon (KR); Jung Pil Lee, Daejeon (KR); Suk Woo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 788 days.

(21) Appl. No.: 17/440,137

(22) PCT Filed: Apr. 28, 2020

(86) PCT No.: PCT/KR2020/005593
§ 371 (c)(1),
(2) Date: Sep. 16, 2021

(87) PCT Pub. No.: WO2020/226324
PCT Pub. Date: Nov. 12, 2020

(65) Prior Publication Data
US 2022/0158171 A1    May 19, 2022

(30) Foreign Application Priority Data
May 8, 2019 (KR) .................. 10-2019-0053695

(51) Int. Cl.
*H01M 4/1395* (2010.01)
*H01M 4/02* (2006.01)
(Continued)

(52) U.S. Cl.
CPC ....... *H01M 4/1395* (2013.01); *H01M 4/0459* (2013.01); *H01M 4/134* (2013.01);
(Continued)

(58) Field of Classification Search
CPC .. H01M 4/1395; H01M 4/134; H01M 4/0459; H01M 4/13; H01M 4/133;
(Continued)

(56) References Cited

U.S. PATENT DOCUMENTS

| | | | |
|---|---|---|---|
| 2011/0045355 A1 | 2/2011 | Ichikawa | |
| 2014/0272584 A1* | 9/2014 | Jiang ................. | H01M 4/58 429/231.95 |

(Continued)

FOREIGN PATENT DOCUMENTS

| | | |
|---|---|---|
| CN | 101997111 A | 3/2011 |
| CN | 104106164 A | 10/2014 |

(Continued)

OTHER PUBLICATIONS

International Search Report for PCT/KR2020/005593 (PCT/ISA/210) mailed on Aug. 10, 2020.
(Continued)

*Primary Examiner* — Adam J Francis
(74) *Attorney, Agent, or Firm* — Birch, Stewart, Kolasch & Birch, LLP

(57) ABSTRACT

An all-solid-state secondary battery according to the present invention includes a positive electrode, a negative electrode, and a solid electrolyte formed between the positive electrode and the negative electrode, wherein the negative electrode is formed through a pre-lithiation process in which a powder mixture configured to form the negative electrode contacts lithium metal before battery assembly. Irreversible capacity is removed through the pre-lithiation process, whereby initial efficiency of the battery is improved, and the process is (Continued)

simplified, whereby mass production is possible and cost is reduced.

4 Claims, 5 Drawing Sheets

(51) Int. Cl.
    *H01M 4/04*     (2006.01)
    *H01M 4/134*     (2010.01)
    *H01M 10/0525*     (2010.01)
    *H01M 10/0562*     (2010.01)

(52) U.S. Cl.
    CPC .. *H01M 10/0525* (2013.01); *H01M 2004/027* (2013.01); *H01M 10/0562* (2013.01); *H01M 2300/0071* (2013.01); *H01M 2300/0082* (2013.01)

(58) Field of Classification Search
    CPC .. H01M 4/139; H01M 4/1393; H01M 4/0447; H01M 4/62; H01M 4/624; H01M 10/0525; H01M 10/0562; H01M 10/052; H01M 10/058; H01M 10/0565; H01M 2004/027; H01M 2300/0071; H01M 2300/0082; Y02E 60/10; Y02P 70/50
    See application file for complete search history.

(56) References Cited

U.S. PATENT DOCUMENTS

| | | | |
|---|---|---|---|
| 2014/0377627 A1 | 12/2014 | Furuya et al. | |
| 2015/0188124 A1 | 7/2015 | Ichikawa | |
| 2016/0126543 A1 | 5/2016 | Ota et al. | |
| 2016/0141596 A1 | 5/2016 | Uhm et al. | |
| 2016/0351893 A1* | 12/2016 | Wietelmann | H01M 4/623 |
| 2016/0351899 A1* | 12/2016 | Iwasaki | H01M 4/366 |
| 2017/0077548 A1 | 3/2017 | Omori et al. | |
| 2018/0047979 A1 | 2/2018 | Iwasaki | |
| 2019/0067684 A1 | 2/2019 | Xu et al. | |
| 2019/0148784 A1* | 5/2019 | Paz | H01M 10/0525 429/7 |
| 2019/0198854 A1 | 6/2019 | Sumiya et al. | |
| 2019/0305298 A1 | 10/2019 | Chae et al. | |
| 2020/0006819 A1 | 1/2020 | Lee et al. | |
| 2020/0144664 A1 | 5/2020 | Kim et al. | |
| 2021/0135274 A1 | 5/2021 | Chae et al. | |

FOREIGN PATENT DOCUMENTS

| | | | |
|---|---|---|---|
| CN | 106207107 A | | 12/2016 |
| CN | 106663775 A | | 5/2017 |
| CN | 107731542 A | | 2/2018 |
| EP | 3 961 762 A1 | | 3/2022 |
| JP | 2012-209195 A | | 10/2012 |
| JP | 2016-225161 A | | 12/2016 |
| JP | 2017-50247 A | | 3/2017 |
| JP | 2017-59325 A | | 3/2017 |
| JP | 2017-513177 A | | 5/2017 |
| JP | 2017-534164 A | | 11/2017 |
| KR | 2000-0074102 A | | 12/2000 |
| KR | 101183682 B1 | * | 9/2012 |
| KR | 10-2015-0014676 A | | 2/2015 |
| KR | 10-2016-0121564 A | | 10/2016 |
| KR | 10-1834072 B1 | | 3/2018 |
| KR | 10-2018-0074701 A | | 7/2018 |
| KR | 10-2018-0127044 A | | 11/2018 |
| KR | 10-2019-0028848 A | | 3/2019 |
| KR | 10-2019-0042336 A | | 4/2019 |
| WO | WO 2017/188388 A1 | | 11/2017 |
| WO | WO 2018/186561 A1 | | 10/2018 |
| WO | WO 2019/054729 A1 | | 3/2019 |

OTHER PUBLICATIONS

Extended European Search Report for European Application No. 20802362.2, dated May 6, 2022.

* cited by examiner

[FIG. 1]
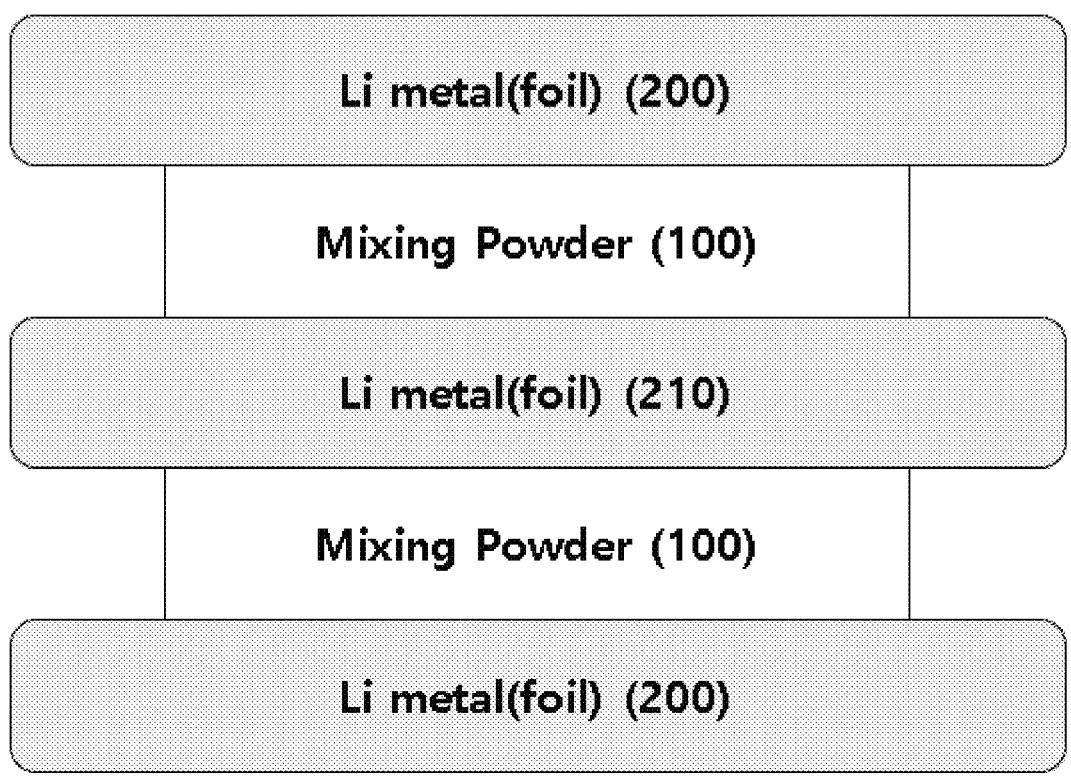

[FIG. 2]
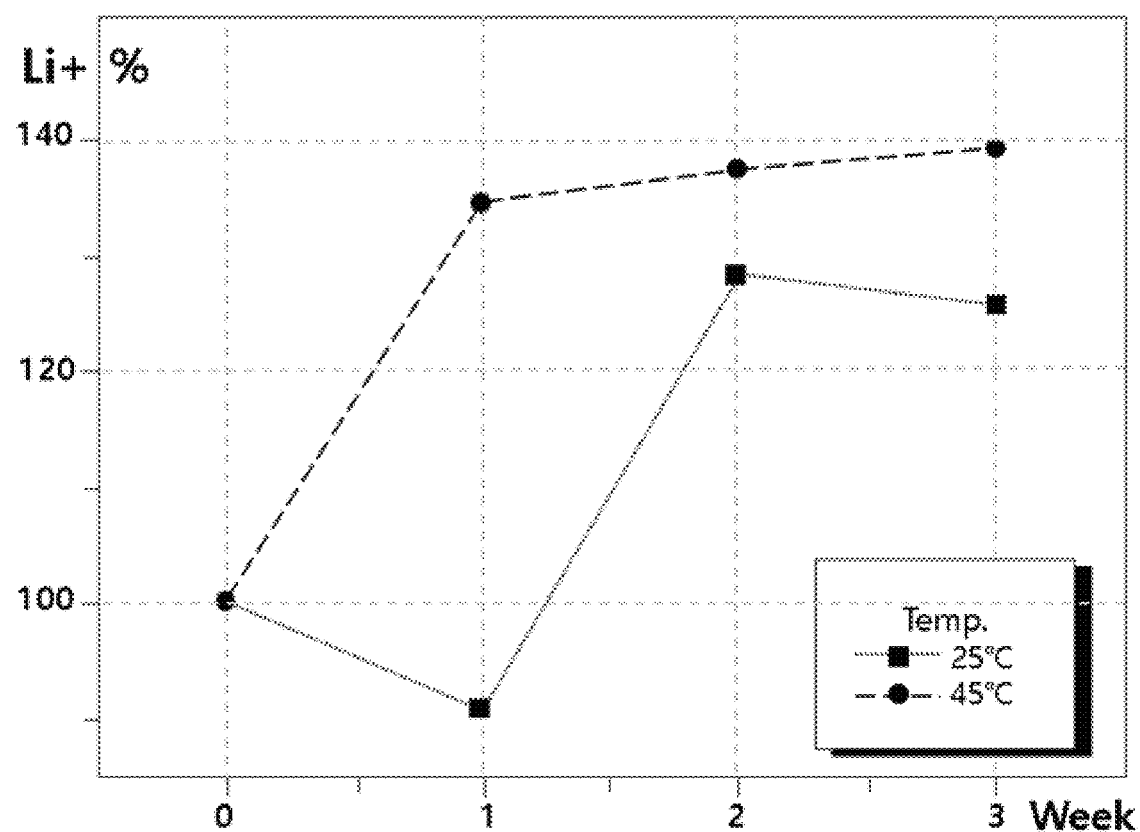

[FIG. 3]
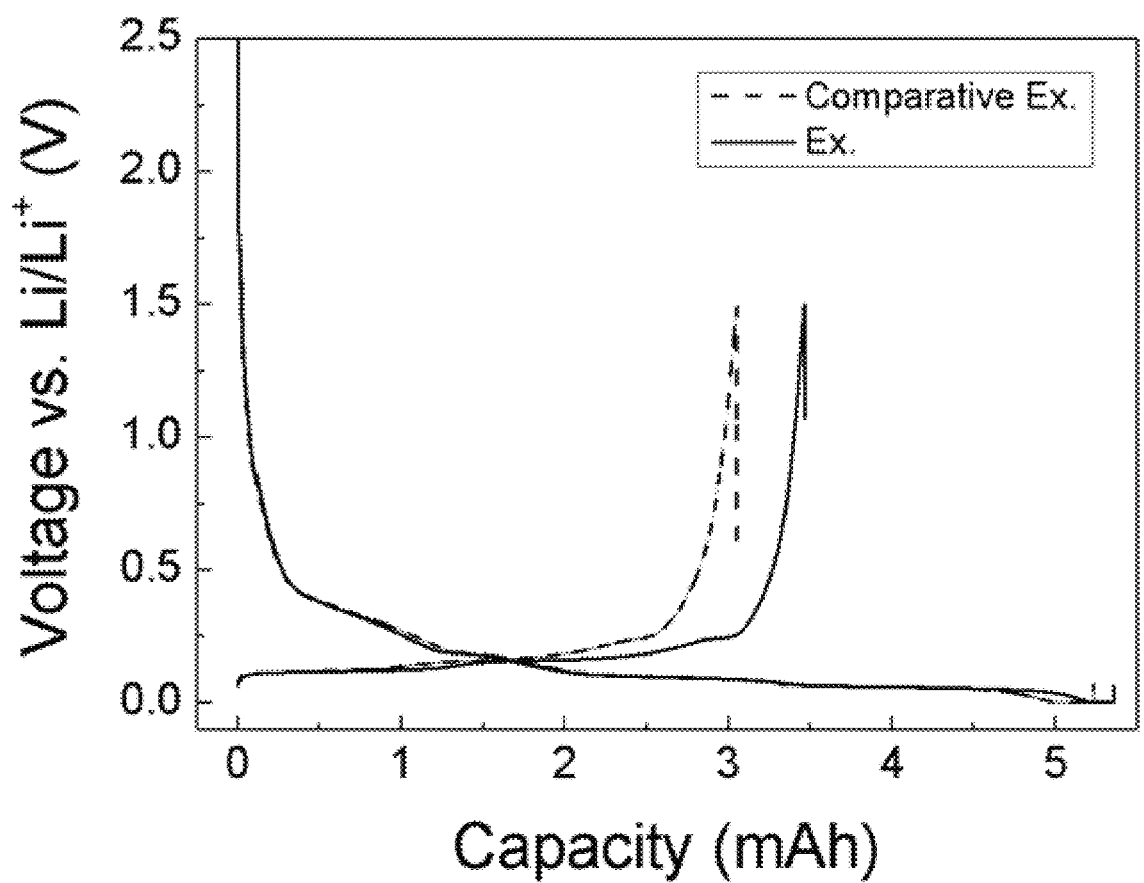

[FIG. 4]
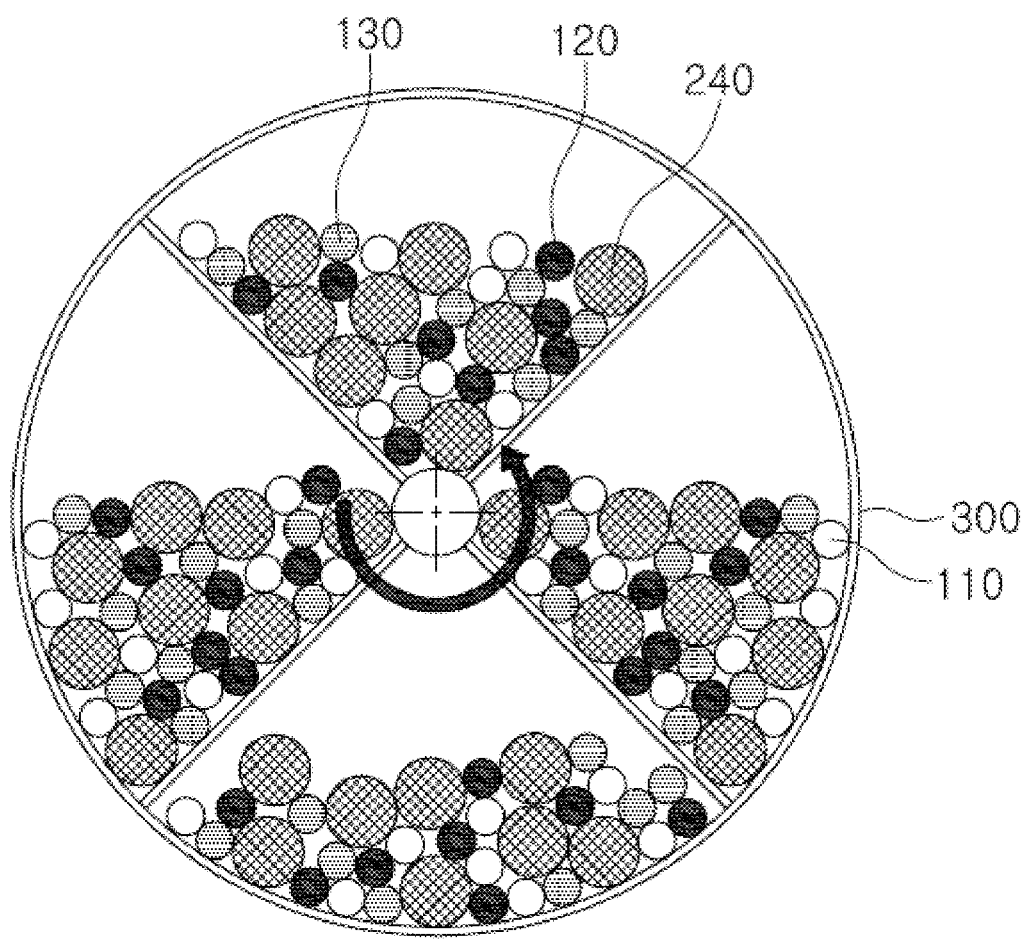

[FIG. 5]
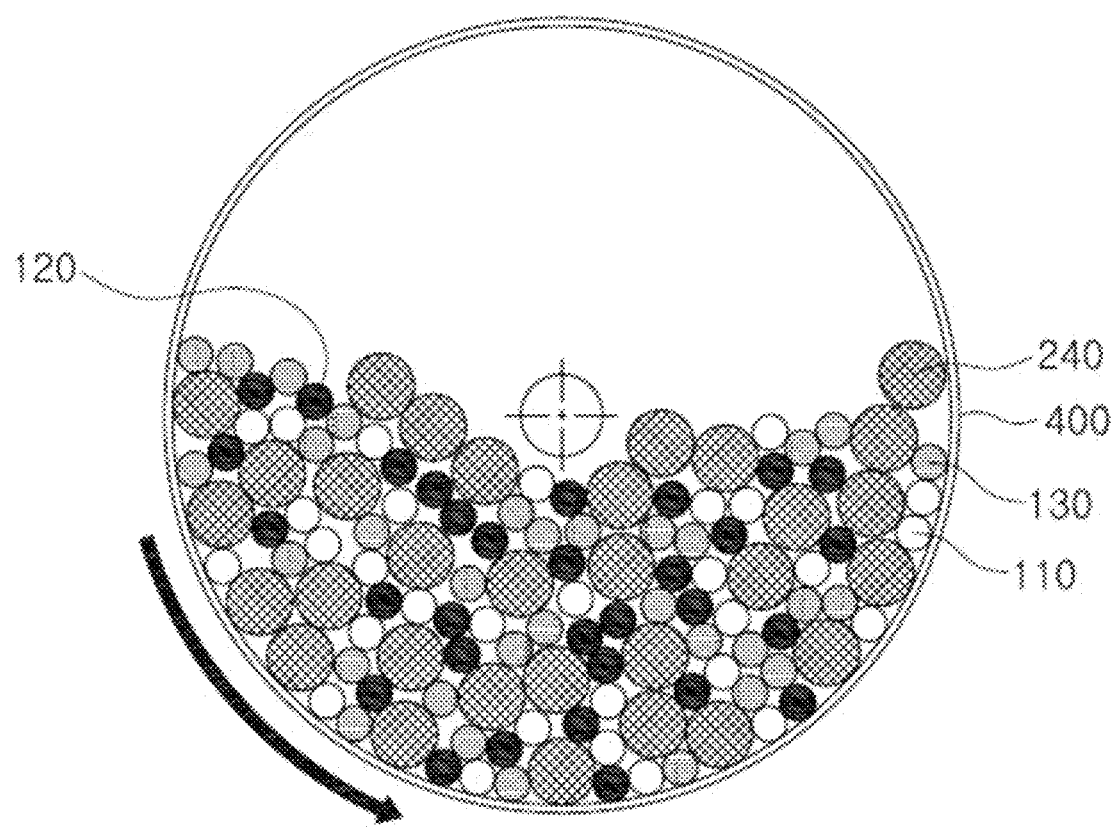

METHOD OF PRE-LITHIATING NEGATIVE ELECTRODE FOR ALL-SOLID-STATE SECONDARY BATTERIES AND SECONDARY BATTERY USING THE SAME

TECHNICAL FIELD

This application is the U.S. National Phase entry of International Application PCT/KR2020/005593, filed Apr. 28, 2020, which claims the benefit of priority to Korean Patent Application No. 2019-0053695 filed on May 8, 2019, the disclosures of which are hereby incorporated by reference herein their entirety.

The present invention relates to an all-solid-state secondary battery subjected to a pre-lithiation process before assembly of the battery, and more particularly to a negative electrode formed by mixing, in advance, an active material, a conductive agent, and a solid electrolyte with each other in a powder state and bringing the mixture into contact with lithium metal in a step before assembly of a lithium secondary battery and an all-solid-state secondary battery including the same.

BACKGROUND ART

As technology related to various kinds of devices has been developed and the demand for such devices has increased, the demand for secondary batteries as energy sources has sharply increased. In terms of materials of such secondary batteries, a lithium ion battery and a lithium ion polymer battery having high energy density, high discharge voltage, higher output stability, a long cycle lifespan, and a low self-discharge rate have been commercialized and widely used.

In general, a carbon-based material, such as graphite, is mainly used as a negative electrode active material of a lithium secondary battery. In recent years, mixed use of a silicon-based material, which has an effective capacity ten times or more that of a carbon-based material, tin, and an oxide thereof has been considered with an increase in demand for a high-capacity secondary battery.

However, the lithium secondary battery has various problems, one of which is related to manufacture and operating characteristics of a negative electrode.

For example, in the case of a carbon-based negative electrode active material, a solid electrolyte interface (SEI) layer is formed on the surface of the negative electrode active material during an initial charging and discharging process (an activation process) thereof. As a result, an initial irreversible phenomenon is caused, the SEI layer collapses as the charging and discharging process is continuously performed, and an electrolytic solution is exhausted in a regeneration process, whereby the capacity of the battery is reduced.

A method of pre-lithiating a silicon oxide-based material in order to solve these problems is known. A method of physiochemically lithiating a negative electrode active material and then manufacturing an electrode and a method of electrochemically pre-lithiating a negative electrode active material are known as the pre-lithiation method. However, the conventional physiochemical method involves a possibility of danger, such as fire or explosion, as the method must be performed at high temperature. As the conventional electrochemical method, on the other hand, a method of depositing Li on the surface of an active material is mainly used. In this case, however, it is not possible to uniformly control initial irreversible capacity, manufacturing cost is increased, and productivity is low.

Korean Patent Application Publication No. 10-2018-0127044 (2018 Nov. 28) (hereinafter referred to as "Patent Document 1") discloses a construction in which an electrode active material including a silicon oxide, a conductive agent, and a binder are mixed to manufacture a slurry, the slurry is coated on an electrode current collector, an electrode is soaked in an electrolytic solution such that the electrode is wet, and the electrode is brought into contact with lithium metal in the state in which the electrolytic solution is removed in order to pre-lithiate the electrode (see paragraph [0036]). In Patent Document 1, the active material and the conductive agent are coated on the electrode current collector, and the same is soaked in the electrolytic solution; however, a construction in which a powder mixture of an active material, a conductive agent, and a solid electrolyte is brought into contact with lithium metal is not disclosed. In addition, a construction in which a slurry is pre-lithiated in a powder state and a construction in which pre-lithiation is performed under a dry room level condition are not disclosed.

Korean Patent Application Publication No. 10-2015-0014676 (2015 Feb. 9) (hereinafter referred to as "Patent Document 2") discloses a construction in which a copper foil having lithium metal rolled on opposite surfaces thereof is soaked in an electrolytic solution at a temperature of −10° C. to 70° C. in order to lithiate the surface of a negative electrode. However, a construction in which a powder mixture of an active material, a conductive agent, and a solid electrolyte is brought into contact with lithium metal is not disclosed.

In particular, Patent Document 1 and Patent Document 2 are technologies for pre-lithiating the negative electrode in the electrolytic solution. In this case, the amount of lithium on the surface of the electrode may be large but the amount of lithium in the electrode may be small, whereby concentration of pre-lithiation in the electrode may be nonuniform. In addition, it is necessary to remove moisture and corrosion generated by a liquid electrolyte, whereby additional cost is incurred.

Chinese Patent Application Publication No. 107731542 (2018 Feb. 23) discloses a construction of a battery using a negative electrode processed through pre-lithiation. However, the pre-lithiation process is not disclosed in detail.

Korean Patent Application Publication No. 10-2018-0074701 (2018 Jul. 3) discloses a construction of an all-solid-state secondary battery using pre-lithiated graphite or pre-lithiated silicon as a negative electrode. However, the pre-lithiation process is not disclosed in detail.

Therefore, there is a need for a method capable of simply and efficiently increasing capacity of a battery through lithiation of a negative electrode.

PRIOR ART DOCUMENT (Patent Document 1) Korean Patent Application Publication No. 10-2018-0127044 (2018 Nov. 28)
(Patent Document 2) Korean Patent Application Publication No. 10-2015-0014676 (2015 Feb. 9)
(Patent Document 3) Chinese Patent Application Publication No. 107731542 (2018 Feb. 23)
(Patent Document 4) Korean Patent Application Publication No. 10-2018-0074701 (2018 Jul. 3)

DISCLOSURE

Technical Problem

The present invention has been made in view of the above problems, and a battery is assembled using a negative electrode having a solid electrolyte interface layer formed thereon in an active material state before assembly of the battery, whereby it is possible to remove irreversibility of a negative electrode active material. Consequently, it is an object of the present invention to increase capacity of a battery by improving initial efficiency of the battery.

In addition, it is an object of the present invention to provide an all-solid-state secondary battery including a negative electrode which has an SEI layer in which concentration of lithium in the electrode is uniform, which exhibits similar performance through the use of the same amount of an electrolytic solution used when a negative electrode slurry is manufactured, and to which an inexpensive and simple pre-lithiation mode is applied.

Technical Solution

In order to accomplish the above objects, the present invention may provide an all-solid-state secondary battery including a positive electrode, a negative electrode, and a solid electrolyte, wherein the negative electrode is formed through a pre-lithiation process in which a powder mixture of a negative electrode active material, a solid electrolyte particle, and a conductive agent is brought into contact with lithium metal before generation of a negative electrode slurry.

In addition, the pre-lithiation process may be performed at a temperature of −10° C. to 80° C.

In addition, the pre-lithiation process may be performed at a temperature of 45° C. to 80° C.

In addition, the weight ratio of the active material, the solid electrolyte particle, and the conductive agent may be 50% to 98%:1% to 40%:1% to 10%.

In addition, an SEI layer having uniform lithium content may be formed through the pre-lithiation process.

In addition, the pre-lithiation process may be performed for one week to four weeks.

In addition, the solid electrolyte particle may be an oxide-based solid electrolyte particle or a polymer-based solid electrolyte particle.

In addition, a method of manufacturing an all-solid-state secondary battery may include the steps of:
   (a) preparing a powder mixture including a negative electrode active material, a solid electrolyte particle, and a conductive agent;
   (b) bringing the powder mixture into contact with lithium metal; and
   (c) mixing the powder mixture with a binder and a solvent to form a slurry.

In addition, the method may further include a step of assembling the negative electrode with a positive electrode and a solid electrolyte to constitute a battery and a step of initially charging and discharging the battery.

In addition, the pre-lithiation process may be performed at a temperature of −10° C. to 80° C.

In addition, the pre-lithiation process may be performed at a temperature of 45° C. to 80° C.

In addition, the weight ratio of the active material, the solid electrolyte particle, and the conductive agent may be 50% to 98%:1% to 40%:1% to 10%.

In addition, an SEI layer having uniform lithium content may be formed through the pre-lithiation process.

In addition, the pre-lithiation process may be performed for one week to four weeks.

In addition, the solid electrolyte particle may be an oxide-based solid electrolyte particle or a polymer-based solid electrolyte particle.

In the present invention, one or more constructions that do not conflict with each other may be selected and combined from among the above constructions.

DESCRIPTION OF DRAWINGS

FIG. 1 is a schematic view showing a stacking mode during a pre-lithiation process before battery assembly according to the present invention.

FIG. 2 is a graph showing the results of ICP spectroscopic analysis revealing changes in lithium content in the pre-lithiation process according to the present invention during different periods at different temperatures.

FIG. 3 is a graph showing the results of initial charging and discharging of Example 7 having a negative electrode subjected to the pre-lithiation process according to the present invention and Comparative Example 2 subjected to the pre-lithiation process after battery assembly for comparison therebetween.

FIG. 4 is a diagrammatic view showing a first method of a mixing mode, which is one of modes of the pre-lithiation process according to the present invention.

FIG. 5 is a diagrammatic view showing a second method of the mixing mode, which is one of the modes of the pre-lithiation process according to the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In the present invention, a "solid electrolyte," which is a component of an all-solid-state secondary battery, means a solid electrolyte layer that replaces a separator configured to achieve insulation between a positive electrode and a negative electrode, and a "solid electrolyte particle" means a material that is included in the solid electrolyte layer and is insulative.

Hereinafter, the present invention will be described in more detail.

In order to solve the above problems, an all-solid-state secondary battery according to the present invention includes a positive electrode, a negative electrode, and a solid electrolyte, wherein the negative electrode is formed through a pre-lithiation process in which a powder mixture of a negative electrode active material, a solid electrolyte particle, and a conductive agent contacts lithium metal before generation of a negative electrode slurry.

(1) Generation of Powder Mixture

A powder mixture includes a negative electrode active material, a conductive agent, and a solid electrolyte particle. The powder mixture is mixed in a dry state, whereby it is easy to form a triple point, which is a point on which the negative electrode active material, the conductive agent, and the solid electrolyte particle commonly abut. The triple point is a point at which electrochemical reaction occurs in an electrode, and capacity of a battery increases in the case in which electrochemical reaction increases as many triple points are formed in the electrode. Also, in the case in which the powder mixture is mixed in a dry state, it is possible to mix desired materials in a desired ratio, and there is no loss of the materials, and therefore mixing in a dry state is preferred to mixing in a wet state. Furthermore, lithium ions are uniformly distributed, compared to a slurry, which is a mixture in a wet state.

The negative electrode active material is not particularly restricted as long as the negative electrode active material is a material that is generally used. As the negative electrode active material, for example, there may be used carbon, such as a non-graphitized carbon or a graphite-based carbon; a metal composite oxide, such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2, and 3 elements of the periodic table, halogen; $0 < x \leq 1$; $1 \leq y \leq 3$; $1 \leq z \leq 8$); lithium metal; a lithium alloy; a silicon-based alloy; a tin-based alloy; a metal oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$; a conductive polymer, such as polyacetylene; or a Li—Co—Ni based material.

The conductive agent is not particularly restricted as long as the conductive agent exhibits high conductivity without inducing any chemical change in a battery to which the conductive agent is applied. For example, graphite, such as natural graphite or artificial graphite; carbon black, such as carbon black, acetylene black, Ketjen black, channel black, furnace black, lamp black, or thermal black; conductive fiber, such as carbon fiber or metallic fiber; metallic powder, such as carbon fluoride powder, aluminum powder, or nickel powder; conductive whisker, such as a zinc oxide or potassium titanate; a conductive metal oxide, such as a titanium oxide; or a conductive material, such as a polyphenylene derivative, may be used as the conductive agent.

A sulfide-based solid electrolyte particle, an oxide-based solid electrolyte particle, and a polymer-based solid electrolyte particle may all be used as long as the solid electrolyte particle, which is a component of the negative electrode, exhibits high lithium ion conductivity. Specifically, it is preferable to use the oxide-based solid electrolyte particle or a polymer-based solid electrolyte particle having a particle shape. The solid electrolyte particle may be made of a material identical to the material used in the solid electrolyte that serves to insulate the positive electrode from the negative electrode of the present invention.

It is preferable for the sulfide-based solid electrolyte particle to contain a sulfur atom (S), to exhibit high ion conductivity of a metal belonging to Group 1 or 2 of the periodic table, and to exhibit high electrical insulation. It is preferable for the sulfide-based solid electrolyte to contain at least Li, S, and P as elements and to exhibit high lithium ion conductivity; however, elements other than Li, S, and P may be included depending on purposes or circumstances.

Specifically, examples of the sulfide-based solid electrolyte particle are as follows. For example, $Li_2S$—$P_2S_5$, $Li_2S$—$P_2S_5$—LiCl, $Li_2S$—$P_2S_5$—$H_2S$, $Li_2S$—$P_2S_5$—$H_2S$—LiCl, $Li_2S$—LiI—$P_2S_5$, $Li_2S$—LiI—$Li_2O$—$P_2S_5$, $Li_2S$—LiBr—$P_2S_5$, $Li_2SLi_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SiS_2$—LiCl, $Li_2S$—$P_2S_5$—SnS, $Li_2S$—$P_2S_5$—$Al_2S_3$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2SSiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—$P_2S_5$—LiI, $Li_2S$—$SiS_2$—LiI, $Li_2S$—$SiS_2$—$Li_4SiO_4$, $Li_2SSiS_2$—$Li_3PO_4$, or $Li_{10}GeP_2S_{12}$ may be used.

An example of a method of synthesizing the sulfide-based solid electrolyte particle is an amorphization method. Examples of the amorphization method include a mechanical milling method, a solution method, and a melting and rapid cooling method. The reason that the amorphization method is used is that it is possible to process the sulfide-based solid electrolyte particle at a normal temperature (25° C.), whereby it is possible to simplify the manufacturing process.

It is preferable for the oxide-based solid electrolyte particle to contain an oxygen atom (O), to exhibit high ion conductivity of a metal belonging to Group 1 or 2 of the periodic table, and to exhibit high electrical insulation.

As the oxide-based solid electrolyte particle, for example, there may be used $Li_{xa}La_{ya}TiO_3$ (xa=0.3 to 0.7 and ya=0.3 to 0.7) (LLT), $Li_{xb}La_{yb}Zr_{zb}M^{bb}_{nb}O_{nb}$ ($M^{bb}$ is at least one of Al, Mg, Ca, Sr, V, Nb, Ta, Ti, Ge, In, or Sn, xb satisfies $5 \leq xb \leq 10$, yb satisfies $1 \leq yb \leq 4$, zb satisfies $1 \leq zb \leq 4$, mb satisfies $0 \leq mb \leq 2$, and nb satisfies $5 \leq nb \leq 20$), $Li_{xc}B_{yc}M^{cc}_{zc}O_{nc}$ ($M^{cc}$ is at least one of C, S, Al, Si, Ga, Ge, In, or Sn, xc satisfies $0 \leq xc \leq 5$, yc satisfies $0 \leq yc \leq 1$, zc satisfies $0 \leq zc \leq 1$, and nc satisfies $0 \leq nc \leq 6$), $Li_{xd}(Al, Ga)_{yd}(Ti, Ge)_{zd}Si_{ad}P_{md}O_{nd}$ (here, $1 \leq xd \leq 3$, $0 \leq yd \leq 1$, $0 \leq zd \leq 2$, $0 \leq ad \leq 1$, $1 \leq md \leq 7$, and $3 \leq nd \leq 13$), $Li_{(3-2xe)}M^{ee}_{xe}D^{ee}O$ (xe satisfies $0 \leq xe \leq 0.1$, $M^{ee}$ is a two-valent metal atom, and $D^{ee}$ indicates a halogen atom or a combination of two or more kinds of halogen atoms), $Li_{xf}Si_{yf}O_{zf}$ ($1 \leq xf \leq 5$, $0 < yf \leq 3$, and $1 \leq zf \leq 10$), $Li_{xq}S_{yg}O_{zg}$ ($1 \leq xg \leq 3$, $0 < yg \leq 2$, and $1 \leq zg \leq 10$), $Li_3BO_3$—$Li_2SO_4$, $Li_2O$—$B_2O_3$—$P_2O_5$, $Li_2O$—$SiO_2$, $Li_6BaLa_2Ta_2O_{12}$, $Li_3PO_{(4-3/2w)}N_w$ (w<1), $Li_{3.5}Zn_{0.25}GeO_4$ having a lithium super ionic conductor (LISICON) type crystalline structure, $La_{0.55}Li_{0.35}TiO_3$ having a perovskite type crystalline structure, $LiTi_2P_3O_{12}$ having a natrium super ionic conductor (NASICON) type crystalline structure, $Li_{1+xh+yh}(Al, Ga)_{xh}(Ti, Ge)_{2-xh}Si_{yh}P_{3-yh}O_{12}$ (here, $0 \leq xh \leq 1$ and $0 \leq yh \leq 1$), or $Li_7La_3Zr_2O_{12}$(LLZ) having a garnet type crystalline structure. In addition, a phosphorus compound including Li, P, and O is preferably used. For example, lithium phosphate ($Li_3PO_4$), LiPON in which a portion of oxygen in lithium phosphate is replaced by nitrogen, or $LiPOD^1$ ($D^1$ being at least one selected from among Ti, V, Cr, Mn, Fe, Co, Ni, Cu, Zr, Nb, Mo, Ru, Ag, Ta, W, Pt, and Au) may be used. In addition, $LiA^1ON$ ($A^1$ being at least one selected from among Si, B, Ge, Al, C, and Ga) is preferably used.

The polymer-based solid electrolyte particle may be a solid polymer electrolyte formed by adding a polymer resin to a lithium salt that is independently solvated or a polymer gel electrolyte formed by impregnating a polymer resin with an organic electrolytic solution containing an organic solvent and lithium salt.

The solid polymer electrolyte particle is not particularly restricted as long as the solid polymer electrolyte particle is made of, for example, a polymer material that is ion conductive and is generally used as a solid electrolyte material of the all-solid-state battery. As examples of the solid polymer electrolyte particle, mention may be made of a polyether-based polymer, a polycarbonate-based polymer, an acrylate-based polymer, a polysiloxane-based polymer, a phosphazene-based polymer, a polyethylene derivative, an alkylene oxide derivative, a phosphoric acid ester polymer, poly agitation lysine, polyester sulfide, polyvinyl alcohol, polyvinylidene fluoride, and a polymer containing an ionic dissociation group. In a concrete embodiment of the present invention, the solid polymer electrolyte particle may include: a branch-like copolymer formed by copolymerizing an amorphous polymer, such as poly methyl methacrylate (PMMA), polycarbonate, polysiloxane, and/or phosphazene, which is a comonomer, in the main chain of a polyethylene oxide (PEO), which is a polymer resin; a comb-like polymer resin; and a crosslinking polymer resin.

The polymer gel electrolyte includes an organic electrolytic solution including lithium salt and a polymer resin, wherein the organic electrolytic solution is included in an amount of 60 parts by weight to 400 parts by weight based on weight of the polymer resin. Although the polymer resin applied to the polymer gel electrolyte is not limited to specific components, a PVC-based resin, a poly methyl methacrylate (PMMA)-based resin, polyacrylonitrile (PAN), polyvinylidene fluoride (PVdF), and polyvinylidene fluoride hexafluoropropylene (PVdF-HFP) may be included.

The lithium salt is a lithium salt that can be ionized and may be represented by $Li^+X^-$. Although a negative ion of the lithium salt is not particularly restricted, $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SFs)_3C^-$, $(CF_3SO_2)_3C$, $CF_3(CF_2)_7SO_3^-$, $CF_3CO_2^-$, $CH_3CO_2^-$, $SCN^-$, or $(CF_3CF_2SO_2)_2N^-$ may be illustrated.

Each of the negative electrode active material, the conductive agent, and the solid electrolyte particle is used in a powder state. Each of the negative electrode active material, the conductive agent, and the solid electrolyte particle is not restricted as long as the same is powder. However, the size of the particle must be set such that the particle does not impede improvement in battery properties, such as initial efficiency, a load property, and a cycle property.

The powder weight ratio of the active material, the conductive agent, and the solid electrolyte particle may be 50 weight % to 98 weight %:1 weight % to 10 weight %:1 weight % to 40 weight %, more preferably 70 weight % to 98 weight %:1 weight % to 5 weight %:1 weight % to 20 weight %.

A method of mixing the powder is not particularly restricted as long as the above materials can be regularly sufficiently mixed. An ordinary dispersion kneader, such as a roll mill or a ball mill, may be used, or a method of simply performing contact between lithium metal and the powder mixture may be used.

Since the powder is mixed in a dry room state, no separate drying is necessary, handling is easy, and the powder is not expensive. In addition, since the powder is used in a dry state, it is also possible to easily set the amount of an electrolytic solution that is used when a slurry is formed in a subsequent process.

(2) Contact of Lithium Metal

A pre-lithiation process is performed through a process of bringing the powder mixture into contact with lithium metal in order to perform the pre-lithiation process before a slurry is formed.

The pre-lithiation process may be performed using any method as long as lithium ions are transferred to the powder mixture. As an example, a method of bringing the powder mixture into contact with a material or object including lithium ions may be used.

As a concrete example of the case in which the powder mixture is brought into contact with a material or object including lithium ions, foil made of lithium metal is continuously disposed on the lower part and/or the upper part of the powder mixture in a contact state. At this time, it is preferable for the foil to be located on both the lower part and the upper part of the powder mixture.

At this time, in the case in which the powder and the foil contact each other for a long time or in the case in which the powder and the foil contact each other at a high temperature, e.g. at a temperature of 45° C. or higher, pre-lithiation is performed more rapidly and in larger quantity.

As another example of the case in which the powder mixture is brought into contact with a material or object including lithium ions, a method of placing and mixing the powder in a barrel made of lithium metal may be used. In the case in which the powder is placed and mixed in a barrel made of lithium metal, there is an advantage in that mixing of the powder can be performed simultaneously with pre-lithiation. In addition, pre-lithiation may be uniformly performed on the powder mixture.

As a third example of the case in which the powder mixture is brought into contact with a material or object including lithium ions, the lithium metal and the powder mixture may be mixed with each other in a stirrer. In the case in which the lithium metal and the powder mixture are mixed with each other, contact between the powder mixture and the lithium metal may increase, whereby it is possible to uniformly perform pre-lithiation on the entirety of the powder mixture for a shorter time. At this time, the stirrer may be the barrel made of the lithium metal mentioned above.

A fourth example of the case in which the powder mixture is brought into contact with a material or object including lithium ions, a method of placing the powder mixture between plates made of lithium metal and pressurizing the powder mixture using a rolling roller may be used. Force of contact between the lithium metal and the powder mixture may be increased by pressurization using the rolling roller, whereby pre-lithiation may be performed more rapidly.

The lithium metal contact process may be performed at a temperature of −10° C. to 80° C., more preferably 45° C. to 80° C. The contact process may be performed in the state in which an initial temperature and a later temperature are different from each other. The contact process may be performed initially at a low temperature, and may be performed later at a high temperature.

In addition, lithium metal contact period is preferably between one week and four weeks. More specifically, the lithium metal contact period may be set to a range of one week to two weeks, for which lithium content is effectively increased irrespective of temperature.

An SEI layer having uniform lithium content may be formed on the surface of the negative electrode active material through the pre-lithiation process.

(3) Coating of Powder Mixture on Negative Electrode Current Collector and Assembly of all-Solid-State Secondary Battery The powder mixture having the SEI layer formed through the pre-lithiation process, a binder, and a solvent are mixed with each other to form a negative electrode slurry. The negative electrode slurry is coated on a negative electrode current collector and is then dried to manufacture a negative electrode. Subsequently, a positive electrode, a solid electrolyte, and the negative electrode are sequentially stacked to assemble an all-solid-state secondary battery.

In general, the negative electrode current collector is manufactured so as to have a thickness of 3 µm to 500 µm. The negative electrode current collector is not particularly restricted as long as the negative electrode current collector exhibits high conductivity while the negative electrode current collector does not induce any chemical change in a battery to which the negative electrode current collector is applied. For example, the negative electrode current collector may be made of copper, stainless steel, aluminum, nickel, or titanium. Alternatively, the negative electrode current collector may be made of stainless steel, the surface of which is treated with carbon, nickel, titanium, or silver. Specifically, the negative electrode current collector may be made of copper. The negative electrode current collector may have a micro-scale uneven pattern formed on the surface thereof so as to increase the force of adhesion of the negative electrode active material. The negative electrode current collector may be configured in any of various forms, such as those of a film, a sheet, a foil, a net, a porous body, a foam body, and a non-woven fabric body.

The binder included in the negative electrode is a component assisting in binding between the active material and the conductive agent and in binding with the current collector. The binder is generally added in an amount of 0.1 weight % to 30 weight % based on the total weight of the mixture including the negative electrode active material. As examples of the binder, polyvinylidene fluoride, polyvinyl alcohol, carboxymethyl cellulose (CMC), starch, hydroxypropyl cellulose, regenerated cellulose, polyvinyl pyrrolidone, polytetrafluoroethylene, polyethylene, polypropylene, ethylene-propylene-diene terpolymer (EPDM), sulfonated EPDM, styrene butadiene rubber, fluoro rubber, and various copolymers may be used.

The negative electrode slurry may be coated on one surface or opposite surfaces of the negative electrode current collector. A method of coating the negative electrode slurry on the negative electrode current collector is not particularly restricted as long as it is possible to increase capacity of the battery and to improve stability of the battery. For example, a doctor blade method, a dipping method, a reverse roll method, a direct roll method, a gravure method, an extrusion method, or a brush painting method may be used. In addition, the thickness of the negative electrode slurry may be appropriately set depending on the thickness of the negative electrode active material layer.

After assembly of the battery, a process of initially charging and discharging the battery in order to activate the battery is performed.

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Concrete examples of the present invention will be described in detail with reference to the accompanying drawings.

Although the present invention will be described based on the following examples, the present invention is not limited to the examples. Characteristics of the present invention will be evaluated through the following method.

FIG. 1 is a schematic view showing a stacking mode during a pre-lithiation process before battery assembly according to the present invention.

Referring to FIG. 1, a powder mixture 100 of an active material, a conductive agent, and a solid electrolyte particle is brought into contact with lithium metal foils 200 and 210, and a pre-lithiation process is performed. The positions of the lithium metal foils 200 and 210 are not restricted as long as the lithium metal foils 200 and 210 can be brought into contact with the powder mixture 100. In order to more rapidly and uniformly perform the pre-lithiation process of the powder mixture 100, however, the lithium metal foils 200 and 210 may be located at the upper part and the lower part of the powder mixture 100.

In order to more efficiently perform the pre-lithiation process of the powder mixture 100, stacking may be performed so as to have a structure in which the powder mixture 100 is interposed between the lithium metal foils 200 and 210.

At an initial voltage of 3.2V, lithium ions present in the lithium metal foils 200 and 210 move to the powder mixture 100 through only direct contact between the powder mixture 100 and the lithium metal foils 200 and 210. The pre-lithiation process is more rapidly performed in the case in which temperature increases.

FIG. 2 is a graph showing the results of ICP spectroscopic analysis revealing changes in lithium content in the pre-lithiation process according to the present invention during different periods at different temperatures.

In Examples 1 to 6 and Comparative Example 1 below, artificial graphite was used as a negative electrode active material, Super P was used as a conductive agent, and LICGC from Ohara Company was used as a solid electrolyte particle.

Example 1

Pre-lithiation was performed using a method of bringing a powder mixture in which a negative electrode active material, a conductive agent, and a solid electrolyte particle were mixed in a weight ratio of 85:2:13 into contact with a foil-shaped lithium metal as shown in FIG. 1. At this time, the pre-lithiation was performed for a contact time of one week at a contact temperature of 25° C. After the pre-lithiation, the average content of lithium ions in an SEI layer of the powder mixture was measured through ICP spectroscopic analysis.

Example 2

Pre-lithiation was performed using the same method as Example 1 except that the time of contact with the foil-shaped lithium metal was changed from one week to two weeks, and the average content of lithium ions in the SEI layer of the powder mixture was measured through ICP spectroscopic analysis.

Example 3

Pre-lithiation was performed using the same method as Example 1 except that the time of contact with the foil-shaped lithium metal was changed from one week to three weeks, and the average content of lithium ions in the SEI layer of the powder mixture was measured through ICP spectroscopic analysis.

Example 4

Pre-lithiation was performed using the same method as Example 1 except that the temperature of contact with the foil-shaped lithium metal was changed from 25° C. to 45° C., and the average content of lithium ions in the SEI layer of the powder mixture was measured through ICP spectroscopic analysis.

Example 5

Pre-lithiation was performed using the same method as Example 1 except that the time of contact with the foil-shaped lithium metal in Example 4 was changed from one week to two weeks, and the average content of lithium ions in the SEI layer of the powder mixture was measured through ICP spectroscopic analysis.

Example 6

Pre-lithiation was performed using the same method as Example 1 except that the time of contact with the foil-shaped lithium metal in Example 4 was changed from one week to three weeks, and the average content of lithium ions in the SEI layer of the powder mixture was measured through ICP spectroscopic analysis.

Comparative Example 1

Pre-lithiation based on contact with the foil-shaped lithium metal was not performed, unlike Example 1, and the average content of lithium ions in the SEI layer of the powder mixture was measured through ICP spectroscopic analysis.

As can be seen from FIG. 2, the lithium content of Examples 4 to 6, in which the temperature of contact with the foil-shaped lithium metal was 45° C., was higher than the lithium content of Examples 1 to 3, in which the temperature of contact with the foil-shaped lithium metal was 25° C.

In addition, it can be seen that, in the case of Examples 4 to 6, in which the contact temperature was 45° C., the lithium content increased as the contact time was increased.

Consequently, it can be seen that it is more preferable to perform pre-lithiation for a longer time at a higher temperature.

Additionally, the result of random sampling measurement at the time of ICP spectroscopic analysis on Examples 1 to 6 reveals that most samples had a lithium content deviation of less than about 5%. Consequently, it can be seen that the negative electrodes manufactured according to the present invention have SEI layers having entirely uniform lithium content.

FIG. 3 is a graph showing the results of initial charging and discharging of Example 7 having a negative electrode subjected to the pre-lithiation process according to the present invention and Comparative Example 2 subjected to the pre-lithiation process after battery assembly for comparison therebetween.

In Example 7 and Comparative Example 2 below, artificial graphite was used as a negative electrode active material, Super P was used as a conductive agent, and LICGC from Ohara Company was used as a solid electrolyte particle. In addition, PVDF was used as a binder, and acetonitrile (AN) was used as a solvent.

Example 7

Pre-lithiation was performed by bringing a powder mixture including a mixed material of a negative electrode active material, a conductive agent, and a solid electrolyte particle into contact with a foil-shaped lithium metal, and then the powder mixture was mixed with a binder and a solvent to form a slurry. At this time, the negative electrode active material, the conductive agent, the solid electrolyte particle, and the binder were mixed with each other so as to have a ratio of 83:1:13:3 wt %. The slurry was coated on a copper negative electrode current collector and was then dried to manufacture a negative electrode.

Comparative Example 2

A negative electrode was manufactured using the same method as in Example 7 except that a powder mixture was not brought into contact with a foil-shaped lithium metal.

In FIG. 3, coin half cells were manufactured using the negative electrodes manufactured according to Example 7 and Comparative Example 2. The manufactured coin half cells were initially charged and discharged once, and the results were compared.

At the time of initial charging and discharging, charging was performed up to 0.005 V at 0.05 C under conditions of constant current/constant voltage (CC/CV), charging was stopped at 0.02 C, discharging was performed up to 1.5 V at 0.05 C under a condition of constant current (CC), and the capacities of the coin half cells were measured.

Each of the electrodes was manufactured under a condition in which the active material, the conductive agent, the solid electrolyte particle, and the binder were mixed in a ratio of 83:1:13:3.

As can be seen from FIG. 3, the capacity of Example 7 according to the present invention increased by about 2.4%. In addition, when comparing initial efficiencies of Example 7 and Comparative Example 2, the initial efficiency of Example 7 was 65%, and therefore it can be seen that the initial efficiency of Example 7 was improved more than Comparative Example 2, the initial efficiency of which was 58%.

Consequently, it can be seen that the negative electrode according to the present invention in which pre-lithiation is performed before initial charging and discharging is superior in capacity and efficiency.

FIG. 4 is a diagrammatic view showing a first method of a mixing mode, which is one of modes of the pre-lithiation process according to the present invention.

As can be seen from FIG. 4, the mixing mode of the pre-lithiation process according to the present invention is a mode in which a powder mixture constituted by an active material 110, a conductive agent 130, and a solid electrolyte particle 120 is placed in a barrel 300 together with lithium metal piece 240 and then the powder mixture and the lithium metal piece are stirred. The barrel 300 may move upwards, downwards, leftwards, and rightwards, or may simply rotate. In addition, the barrel 300 may be partitioned such that the powder mixture can more effectively contact the lithium metal piece. This mode has an advantage in that it is possible to more uniformly perform pre-lithiation of the powder mixture than in the stacking mode shown in FIG. 1. In addition, the pre-lithiation is performed when the powder mixture is mixed, and therefore processing time is shorter and thus more economical than the stacking mode shown in FIG. 1.

FIG. 5 is a diagrammatic view showing a second method of the mixing mode, which is one of the modes of the pre-lithiation process according to the present invention.

As can be seen from FIG. 5, the mixing mode of the pre-lithiation process according to the present invention is a mode in which a powder mixture constituted by an active material 110, a solid electrolyte particle 120, and a conductive agent 130 may be mixed in lithium metal barrel 400. At this time, lithium metal piece 240 may be further placed in the lithium metal barrel 400 such that the lithium metal piece can be mixed with the powder mixture, as shown in FIG. 4, in order to effectively perform the pre-lithiation process. The lithium metal barrel 400 may be formed so as to have the shape of a stirrer. The shape of the lithium metal barrel 400 is not particularly restricted as long as the lithium metal barrel can be sufficiently mixed with the powder mixture and the size of the surface of the lithium metal barrel on which the powder contacts the lithium metal is large. In the case in which the lithium metal 240 is further introduced into the lithium metal barrel 400 when the powder mixture is mixed in the lithium metal barrel 400, as shown in FIG. 5, the number of times of contact between the powder mixture, the lithium metal barrel 400 including lithium ions, and the lithium metal 240 increases, whereby pre-lithiation is more rapidly and uniformly performed.

A person having ordinary skill in the art to which the present invention pertains will appreciate that various applications and modifications are possible based on the above description without departing from the scope of the present invention.

DESCRIPTION OF REFERENCE NUMERALS

100: Powder mixture
110: Active material
120: Solid electrolyte particle
130: Conductive agent
200, 210: Lithium metal foils
240: Lithium metal piece
300: Barrel
400: Lithium metal barrel

INDUSTRIAL APPLICABILITY

As is apparent from the above description, an all-solid-state secondary battery using a negative electrode pre-lithiated before battery assembly according to the present invention needs no more lithium at the time of assembling the battery. Consequently, there is no irreversible capacity, and therefore the capacity of the battery increases.

In such a pre-lithiation mode, pre-lithiation is performed through contact with a metal, and therefore pre-lithiation is more simply and easily performed than in a conventional pre-lithiation method of soaking a negative electrode in an electrolytic solution to perform pre-lithiation. Consequently, mass production of high-capacity all-solid-state batteries is possible. In addition, rapid reaction is possible due to direct contact with a metal. Consequently, the pre-lithiation mode according to the present invention is less expensive and exhibits higher productivity than a conventional pre-lithiation mode.

In addition, in the initial activation process of the all-solid-state battery, a pre-lithiation reaction, in which lithium ions moved to the negative electrode react with the negative electrode and are thus captured, occurs, and about 10% of the lithium ions moved to the negative electrode do not return to a positive electrode, i.e. no reversible reaction occurs. In the case in which the irreversible capacity of the lithium ions increases, the capacity of the battery decreases. In the case in which a pre-lithiation reaction is performed on the negative electrode in advance before an initial activation process is performed after assembly of an electrode assembly, it is possible to remove, in advance, the irreversible capacity of the lithium ions generated in the state in which the secondary battery is assembled. Also, in the present invention, the electrode assembly is assembled after the pre-lithiation process is performed, and therefore no gas is generated due to irreversible reaction at the time of pre-lithiation of a carbon electrode used as the negative electrode, whereby a problem of swelling does not occur.

For a liquid electrolyte, an SEI layer is formed after assembly, and therefore battery decomposition is necessary at the time of analysis. In this case, however, the SEI layer reacts with air, and therefore an additional reaction may occur and thus analysis is difficult. In the present invention, however, only the SEI layer is formed on the surface of an active material due to the irreversible reaction, and the electrolyte is in a powder state before assembly of the battery, and therefore it is possible to very easily perform reaction analysis.

The invention claimed is:

1. A method of manufacturing an all-solid-state secondary battery, the method comprising a pre-lithiation process comprising:
  (a) preparing a powder mixture comprising a negative electrode active material, a plurality of solid electrolyte particles, and a conductive agent;
   wherein the negative electrode active material, the solid electrolyte particles, and the conductive agent commonly abut to form a triple point in the powder mixture,
  (b) bringing the powder mixture into contact with lithium metal to form a pre-lithiated powder mixture, wherein pre-lithiation is performed at a temperature of 45° C. to 80° C.; and
  (c) mixing the pre-lithiated powder mixture with a binder and a solvent to form a slurry,
   wherein the pre-lithiation process is performed for one week to four weeks, and
   wherein a solid electrolyte interface (SEI) layer having uniform lithium content is formed through the pre-lithiation process on the negative electrode active material, and
   wherein the powder mixture is mixed in a dry state.

2. The method according to claim 1, further comprising:
assembling the negative electrode with a positive electrode and a solid electrolyte to constitute a battery; and
initially charging and discharging the battery.

3. The method according to claim 1, wherein the powder mixture comprises 50% to 98% of the active material, 1% to 40% of the solid electrolyte particles, and 1% to 10% of the conductive agent based on a total weight of the powder mixture.

4. The method according to claim 1, wherein the solid electrolyte particles are oxide-based solid electrolyte particles or polymer-based solid electrolyte particles.

* * * * *